(12) United States Patent
Kim

(10) Patent No.: US 6,990,198 B2
(45) Date of Patent: Jan. 24, 2006

(54) APPARATUS AND METHOD FOR SECURING COMMUNICATION INFORMATION IN CDMA COMMUNICATION SYSTEM

(75) Inventor: Kiho Kim, Seoul (KR)

(73) Assignee: Great World Wide Ltd., Hong Kong (HK)

( * ) Notice: Subject to any disclaimer, the term of this patent is extended or adjusted under 35 U.S.C. 154(b) by 841 days.

(21) Appl. No.: 09/866,008

(22) Filed: May 24, 2001

(65) Prior Publication Data

US 2003/0035542 A1 Feb. 20, 2003

(51) Int. Cl.
*H04K 1/04* (2006.01)
*H04K 1/06* (2006.01)

(52) U.S. Cl. .................. 380/37; 380/236; 380/283; 380/257; 380/270; 704/270.1; 370/479; 713/171

(58) Field of Classification Search .................. 380/37, 380/236, 283, 257, 270; 704/270.1; 370/479; 713/171
See application file for complete search history.

(56) References Cited

U.S. PATENT DOCUMENTS

| 5,659,569 | A * | 8/1997 | Padovani et al. | 370/479 |
| 6,266,418 | B1 * | 7/2001 | Carter et al. | 380/257 |
| 6,571,212 | B1 * | 5/2003 | Dent | 704/270.1 |
| 2001/0038695 | A1 * | 11/2001 | Kim | 380/283 |

OTHER PUBLICATIONS

Leonard Schiff and A. Chockalingam, Signal design and system operation of Globalstar versus IS-95 CDMA, vol. 6, Issue 1 (Feb. 2000) pp. 47-57; Year of publication: 2000; ISSN: 1022-0038.*

* cited by examiner

*Primary Examiner*—Gilberto Barron, Jr.
*Assistant Examiner*—Samson Lemma
(74) *Attorney, Agent, or Firm*—Anderson Kill & Olick, PC

(57) ABSTRACT

An apparatus and a method for securing a communication information in a CDMA communication system are disclosed. The method of the invention comprises the steps of encoding a input analog signal as an information bit having a predetermined size and generating a vocoder packet information bit, and encrypting said encoded vocoder packet information bit using a block cipher and a security key, and adding a frame quality indicator and the encoder tail bits to the encrypted vocoder packet information bit and configuring it as a CDMA frame, and transmitting the CDMA frame which passes a convolutional encoder, interleaver, and modulator in sequence, to a base station through an assigned frequency band.

Further, The method of the invention comprises the steps of receiving a signal from a base station, and reproducing it as a CDMA frame, and extracting an encrypted vocoder packet information bit from the reproduced CDMA frame, and decrypting the encrypted vocoder packet information bit by a block cipher and a security key, and decoding the decrypted vocoder packet information bit.

17 Claims, 5 Drawing Sheets

APPARATUS AND METHOD FOR SECURING COMMUNICATION INFORMATION IN CDMA COMMUNICATION SYSTEM

BACKGROUND OF THE INVENTION

1. Field of the Invention

This invention relates to a CDMA communication system, and more particularly to an apparatus and a method for securing a communication information in a CDMA communication system, thereby enabling the system to communicate privately with no overhearing.

2. Description of the Related Art

In a conventional CDMA communication system according to the IS-95 standard, a voice is encoded as an information bit by a vocoder (a voice encoder/decoder) and modulated in a reverse traffic channel. The modulated signal is transmitted to a base station. The modulated signal from the base station is reproduced as the original information bit in a forward traffic channel and it is decoded as an original voice by a vocoder. By the above process, it is possible to communicate between the remote mobiles.

However, the conventional CDMA system has the disadvantage that the information bit passing through only the vocoder can be detected at the base station or at a switching system, and the detected information bit can be easily decoded as the original voice. Thus, the conventional CDMA system has weakness for an overhearing.

U.S. Pat. No. 5,727,064 discloses the technique for solving the disadvantage, wherein a scrambler is added to a longcode generator. But, the technique can not be applied to the conventional CDMA system without any change because it requires the modification of IS-95 CDMA facilities, and it has a limit to communicate between the different user groups using the different security keys.

SUMMARY OF THE INVENTION

It is an object of the present invention to provide an apparatus and a method for securing a communication information in a CDMA communication system, which enables the system to communicate privately with no overhearing while the modification of the conventional base station and the switching system according to IS-95 standard is not required.

The foregoing object is accomplished in the present invention by an apparatus for securing communication information in CDMA communication system comprising a vocoder encoding the input analog signal as an information bit having a predetermined size and generating a vocoder packet information bit, and an encryptor encrypting the vocoder packet information bit from said vocoder, and a CDMA framer adding a frame quality indicator and the encoder tail bits to the encrypted vocoder packet information bit from said encryptor to configure as a CDMA frame, and a CDMA frame transmitter transmitting the CDMA frame which passes a convolutional encoder, interleaver, and modulator in sequence, to abase station through an assigned frequency band, and a CDMA frame receiver receiving a signal from the base station and reproducing the CDMA frame, and a CDMA deframer extracting the encrypted vocoder packet information bit from the CDMA frame reproduced by said CDMA frame receiver, and a decryptor decrypting the encrypted vocoder packet information bit extracted by said CDMA deframer, and a vocoder decoding the decrypted vocoder packet information bit from said decryptor as an analog signal, wherein said encryptor encrypts the vocoder packet information bit using a block cipher and a security key, said decryptor decrypts the encrypted vocoder packet information bit using said block cipher and a security key shared with the other mobile.

In addition, the foregoing object is accomplished in the present invention by providing a method for securing communication information in CDMA communication system comprising the steps of encoding a input analog signal as an information bit having a predetermined size and generating a vocoder packet information bit, and encrypting said encoded vocoder packet information bit using a block cipher and a security key, and adding a frame quality indicator and the encoder tail bits to the encrypted vocoder packet information bit and configuring it as a CDMA frame, and transmitting the CDMA frame which passes a convolutional encoder, interleaver, and modulator in sequence, to a base station through an assigned frequency band.

The foregoing object is also accomplished in the present invention by providing a method for securing communication information in CDMA communication system comprising the steps of receiving a signal from a base station, and reproducing it as a CDMA frame, extracting an encrypted vocoder packet information bit from the reproduced CDMA frame, and decrypting the encrypted vocoder packet information bit by a block cipher and a security key, and decoding the decrypted vocoder packet information bit.

BRIEF DESCRIPTION OF THE DRAWINGS

The features and advantages of the present invention will be more clearly understood from the following description taken in conjunction with the accompanying drawings, in which.

DETAILED DESCRIPTION OF THE PREFERRED EMBODIMENTS

1. Reverse/Forward Traffic Channel

Figure 1:
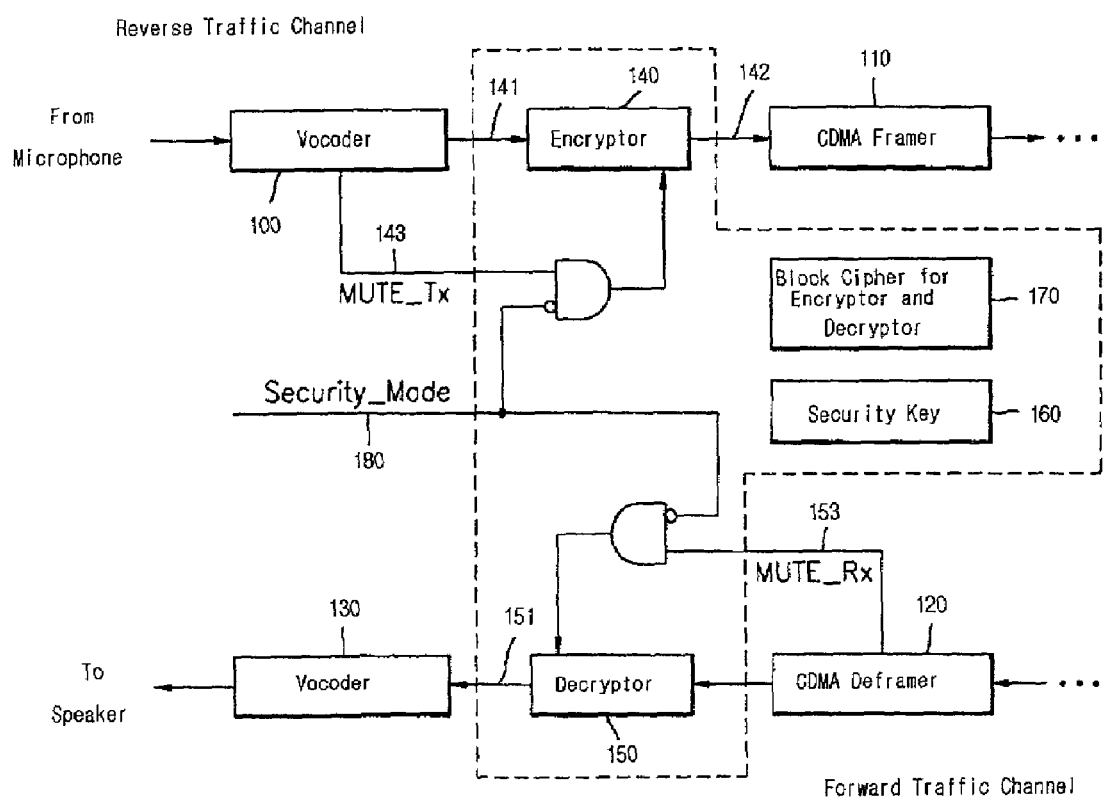
FIG. 1 is a block diagram showing the traffic channel according to the present invention.

FIG. 1 is a block diagram showing the traffic channel according to the present. In FIG. 1, a dotted block shows an essential part of the invention.

Referring to FIG. 1, a reverse traffic channel will be described in the following.

A voice from a microphone is encoded as a vocoder packet information bit 141 by a vocoder 100, and transmitted to an encryptor 140. Using a block cipher 170 such as DES and triple DES, the encryptor 140 encrypts all or the part of the vocoder packet information bits 141 from the vocoder 100 and generates an encrypted vocoder packet information bit 142 and sends it to a CDMA framer 110. In the encryption process, a security key 160 is used, which is stored in the encryptor 140 or exchanged in a safe manner.

A CDMA framer 110 performs the process for making a CDMA frame by adding a frame quality indicator and the encoder tail bits to the encrypted vocoder packet information bit 142.

Now, Referring to FIG. 1, a forward traffic channel will be described.

Using a block cipher 170 identical to that in the reverse channel, a decryptor 150 decrypts all or the part of the encrypted vocoder packet information bits 152 from a CDMA deframer 120 to reproduce the original vocoder packet information bit 151 and sends them to a vocoder 130. In the decryption process, a security key 160 is also used, which is stored in the decryptor 150 or exchanged in a safe manner. Here, the CDMA deframer 120 performs the reverse process as that of the CDMA framer 110.

2. Encryption/Decryption

The encryption of the vocoder packet information bit 141 and the decryption of the encrypted vocoder packet information bit 152 are performed in bite by the block cipher 170, and thus only the information bits corresponding to a multiple of 8 are encrypted or decrypted.

For Example, in IS-95A 9600bps frame, only 21 bytes are encrypted/decrypted since the number of the information bits are 172 bits (=8×21+4). At the information bits of 172 bits (1) if it's a full rate, all 171 bits (vocoder output) excepting the first 1 bit Format bit (0) are encrypted/decrypted, and (2) if it isn't a full rate (for example, ½ rate, 80 bits), the bits, which corresponds to output of the vocoder, of the remaining 168 bits excepting the first 4 bits Format bits (for example ½ rate 1000), that is, only a part of the ½ bits are encrypted/decrypted. However, when the amount of the calculations are too much to be encrypted/decrypted in a given time, only the part of them (for example, 8 bytes) are encrypted/decrypted. In addition, when the output of the vocoder 100 is a mute (⅛ rate), (which is different in size according to vocoder, and is usually discriminated throuah format bits) the encryption/decryption process may be omitted in order to prevent a repeated transmission of the same pattern or in or to prevent a noise. Using a software or a hardware, the encryptor 140 and decryptor 150 performs the encryption/decryption process every 20 ms after the vocoder completes the encoding.

For the encryption/decryption, assume the case using the DES (Data Encryption Standard) selected as a FIPS PUB 46 (Federal Information Processing Standard 46) by the NIST (National Institute of Standards and Technology).

Figure 2:
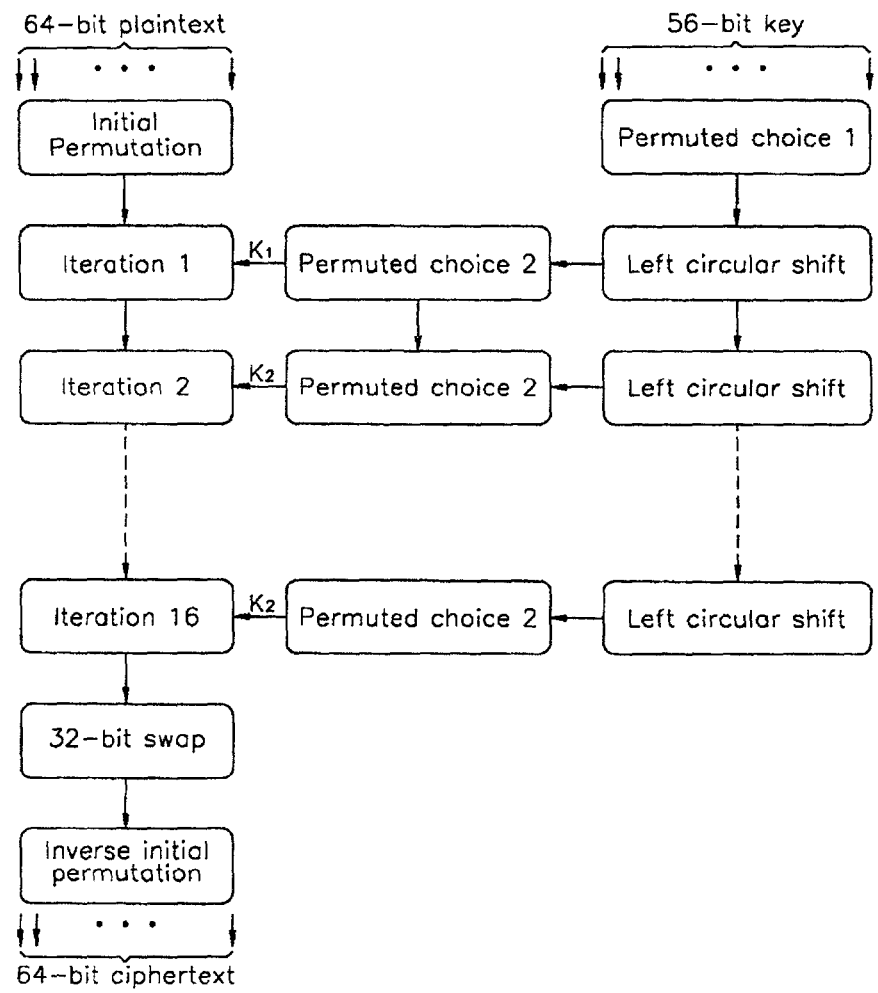
FIG. 2 shows a DES algorithm applicable to the present invention.
Figure 3:
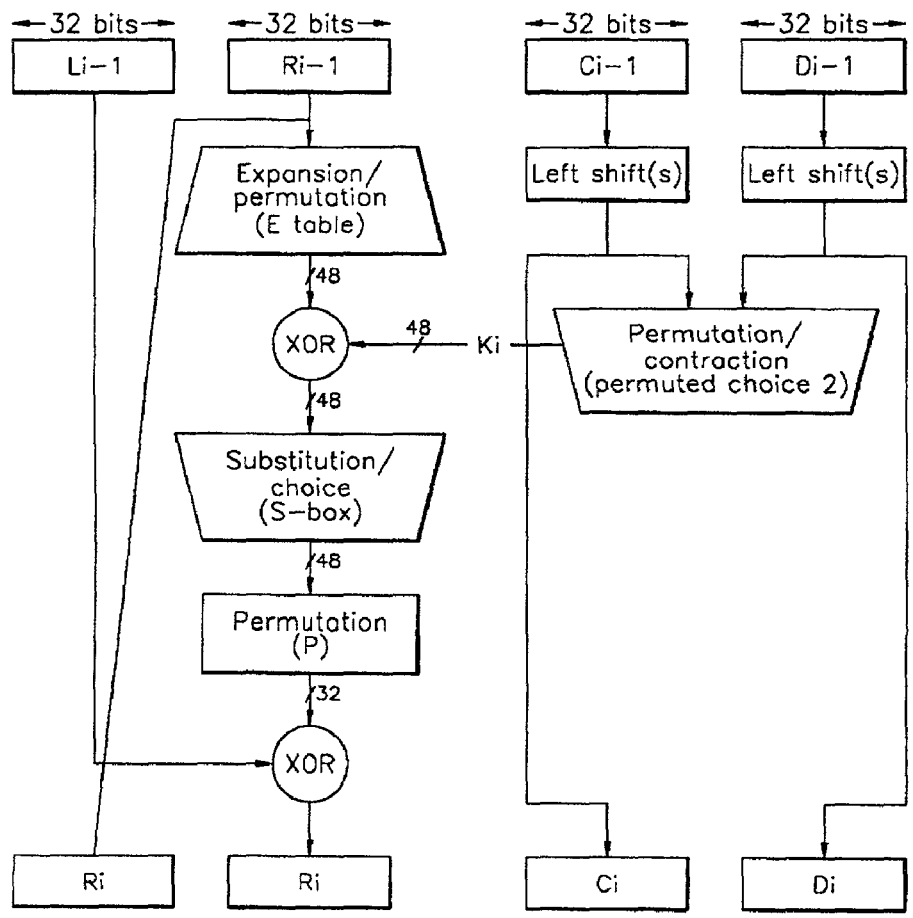
FIG. 3 shows an illustrated single iteration in the DES algorithm of FIG. 2.

FIG. 2 shows a DES algorithm applicable to the present invention and FIG. 3 shows an illustrated single iteration in the DES algorithm of FIG. 2 using a 64 bits text and 56 bits security key. In this case, for example, assume that only the first 8 bytes of the 172 bits are encrypted/decrypted in a full rate. Then, the 64 bits plain text (for example, 01 23 45 67 89 ab cd e7) of FIG. 2 expresses the first 8 bytes which corresponds to pure output of the vocoder of the 172 vocoder packet information bits transmitted from the vocoder 100, and 56 bits key (for example, 01, 23, 45, 67 89 ab de) of FIG. 2 indicates a security key 160 which a sending and a receiving mobile are sharing. The 172 encrypted vocoder packet information bits are obtained by adding the remaining unencrypted 108 bits to the 64 bits cipher text (for example, c9 57 44 25 6a 5e d3 1d) from the encryptor 140 in front and back of the formal bits and the remaining vocoder output.

Figure 4:
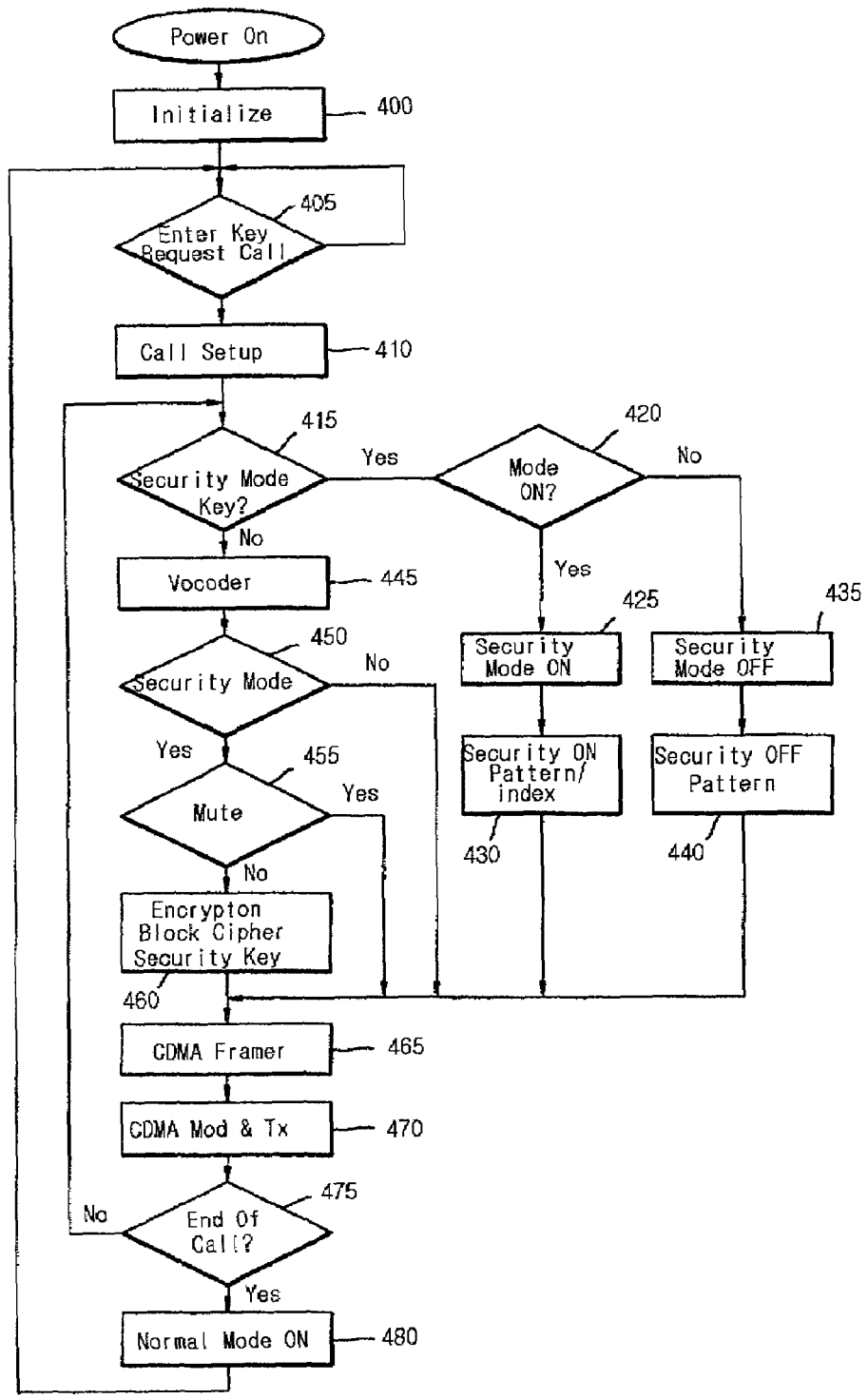
FIG. 4 shows a flow diagram of encryption/transmission process according to a preferred embodiment of the present invention.

A decryption process, which is a reverse process of the encryption, will be described. The original 64 bits plain text (for example, 01 23 45 67 89 ab cd; FIG. 4) is obtained by decrypting the 8 encrypted bytes (i.e. 64 bits cipher text in FIG. 2 (for example, c9 57 44 25 6a 5e d3 1d)) among the 172 encrypted vocoder packet information bits from the CDMA deframer 120 and 56 bits key in FIG. 2 (for example, 01 23 45 67 89 ab cd), in a reverse order as in the encryption process. The 172 vocoder packet information bits generated by adding a remaining 108 bits to the 64 bits plain text are transmitted to the vocoder 130 and decoded therein to reproduce the original voice.

The block cipher such as DES and triple DES is used for the encryption/decryption process.

3. Security Mode On/OFF

For a communication with the mobiles to which the above security method can not be applied, a sending mobile is set to the security mode On or Off if a predefined key is entered at the beginning of the communication, and a receiving mobile is also set to the security mode On or Off identically to the sending mobile. This enables the remote mobiles to communicate privately without any overhearing. Such security mode ON/OFF with the predefined key may be performed before a call setup, or may be performed during the communication after a call setup.

The security mode ON is performed as the following. An ON key requesting the security mode is entered in a reverse traffic channel. Then, a first pattern (distinguished from the vocoded voice) corresponding to the security mode ON is transmitted to the other mobile with the information bit. The other mobile receives and checks the first pattern to set the security mode ON.

The security mode OFF is performed as the following. An OFF key is entered during the communication and a second pattern (distinguished from the vocoded voice) corresponding to the security mode OFF is transmitted to the other mobile with the information bit. The other mobile receives and checks the second pattern to set the security mode OFF and returns back to the normal mode. Alternatively, the security mode may be automatically set to OFF when the communication is completed. With this method, it is possible to repeat the security mode ON/OFF during the communication.

In a weak wave area, an error may be occurred in the patterns transmitted for the security mode ON/OFF and thus it may be happened that the receiving mobile can not be set to the security mode ON/OFF. Then, it is impossible to communicate between the remote mobiles because the sending mobile is set to the security mode On and the receiving mobile to the security mode OFF. This can be settled with the following solutions; 1) sending the security mode ON/OFF signal repeatedly to reduce the occurrence of the error, or 2) informing the receipt of the security mode On/OFF signal by sending a ECHO signal from the receiving mobile to the sending mobile when the sending mobile transmits the security mode On/Off signal to the receiving mobile and communicating each other after the sending mobile detects the ECHO signal from the receiving mobile and sets the security mode to ON/OFF.

The ON key and the OFF key used to set the security mode ON/OFF are selected among the keys which does not affect the communication. Further, in the case that the security mode is set to ON, the security key in the block cipher may be transmitted with the ON key or a scheme for finding out the security key may be transmitted with the ON key, which will be described in the following.

4. Mute Handling

Generally, a mute denotes a condition that no voice is detected for 20 ms. In the case of the mute, the encryption process in the encryptor 140 and the decryption process in the decryptor 150 may be bypassed by the signals MUTE_Tx 143 or MUTE_Rx 153, and further may be bypassed by a signal Security_Mode 180 in accordance with the security mode.

TABLE 1

Operation of the encryptor in accordance with
the security mode and the mute

| MUTE_Rx | Security Mode | |
|---|---|---|
| | Security_Mode ON | Security_Mode OFF |
| MUTE_Tx ON | bypass | bypass |
| MUTE_Tx OFF | encryption | bypass |

TABLE 2

Operation of the decryptor in accordance with
the security mode and the mute

| MUTE_Rx | Security Mode | |
|---|---|---|
| | Security_Mode ON | Security_Mode OFF |
| MUTE_Rx ON | bypass | bypass |
| MUTE_Rx OFF | decryption | bypass |

Tables 1 and 2 shows the operation of the encryptor and the decryptor in accordance with the security mode and the mute, respectively. Referring Tables 1 and 2, the encryption and the decryption are all bypassed when the signal Security_Mode 180 is OFF. In addition, altough the signal Security_Mode 180 is ON, the encryption and the decryption are also bypassed when the signals MUTE_Tx 143 or MUTE_Rx 153 is ON.

The signals MUTE_Tx 143 and the MUTE_Rx 153, which indicate whether the present vocoder packet contains the information corresponding to the mute, can be expressed by a flag in a software implementation and can be handled as an additional signal in a hardware implementation. The signal Security_Mode 180 indicates whether the security mode is ON or OFF.

In a fixed rate, a separate process is not required when the mute happens. However, in a variable rate when the mute happens, it is possible to easily cheek the mute status of the frame through format its of the vocoder packet without any special process. In this case, the encryption and decryption is not performed. Accordingly, a new logic is not needed for the implementation of the present invention.

5. Sharing Security Key

The block ciphers for the encryptor 140 and the decryptor 150 use the same algorithm and the same security key. For this reason, there is required a scheme for sharing the security key between a transmitter and a receiver remotely separated from each other.

A first scheme is to send a security key from the transmitter to the receiver when the security mode is set to ON. For example, when the security mode is set to ON, the 172 information bits in a IS-95 9600 bps frame are transmitted as a specific pattern (for example, 5555 . . . 555 in Hexadecimal) denoting a Security_Mode ON, and then the 128 bits in a next frame (if the security key is 128 bits) is defined as a security key, or a security key encrypted by a master key (generally called as a session key and used as a disposable key) is transmitted. When the master key is used, the mobiles in communication share the same master key, which is stored at an authorized organization.

A second scheme is to specify one of the keys stored in a transmitter and a receiver in the same manner (for example, 100 keys of 128 bits) when the security mode is set to ON. In other words, among the 172 information bits in a IS-95 9600 bps frame, for example 164 bits are transmitted as a specific pattern (such as 5555 . . . 5 in hexadecimal) denoting the security mode ON and the remaining 8 bits are used as an index of the 256 security keys stored in secrecy. At this time, the stored security keys may be configured as the security keys which the mobile manufacturer provides and the security keys which a subscriber enters by himself.

A third scheme is that the two subscribers exchange only the security key via a separate call. The key to be exchanged can be obtained by the subscribers' entrance or by a random number generator in the mobile. The security key exchanged according to the third scheme is specified and used by the second scheme when the security mode is set to ON.

6. Encryption/Transmission Process

FIG. 4 shows a flow diagram of the encryption/transmission process according to a preferred embodiment of the present invention. Referring FIG. 4, an encryption process will be described in detail.

First, when the power of the transmitter is ON, the initialized process in the transmitter is performed (step 400). Consequently, when a subscriber enters a key to request a call (step 405), the call is setup (step 410). At this time, if the entered key is the security mode ON key (step 415 and 420), then the security mode of the transmitter is set to ON (step 425) and the specific pattern indicating the Security_Mode ON and an index of the security key selected among the multiple security keys in the transmitter are added to the information bit in the traffic channel (step 430).

If the entered key is the security mode OFF key (step 415 and 420), then the security mode of the transmitter is set to OFF (step 435) and the specific pattern indicating the Security_Mode OFF is added to the information bit in the traffic channel (step 440).

If the security mode key is not entered in the step 415, then an input signal is encoded as an information bit and the vocoder packet information bit is generated by a vocoder (step 445). If the security mode is on (step 450) and the vocoder packet information bit is not a mute (step 445), then the vocoder packet information bit is encrypted using a block cipher and a security key (step 460). Otherwise, the steps 455 and 460 are bypassed. In a CDMA framer, the frame quality indicator and the encoder tail bits are added to such encrypted or unencrypted vocoder packet information bit to configure a CDMA frame (step 465), and then the CDMA frame passes a convolutional encoder, interleaver, and modulator in sequence, and finally transmitted to a base station through an assigned frequency band (step 470). In a step 475, if the call is maintained, then the routine is returned to the step 415. If the call is completed, then the security mode is set to a normal mode (step 480) and the routine is returned to the step 405.

Each functions in relation to the encryption process of the invention may be implemented by a software or a hardware such as ASIC (Application Specific Integrated Circuit)

7. Reception/Decryption Process

Figure 5:
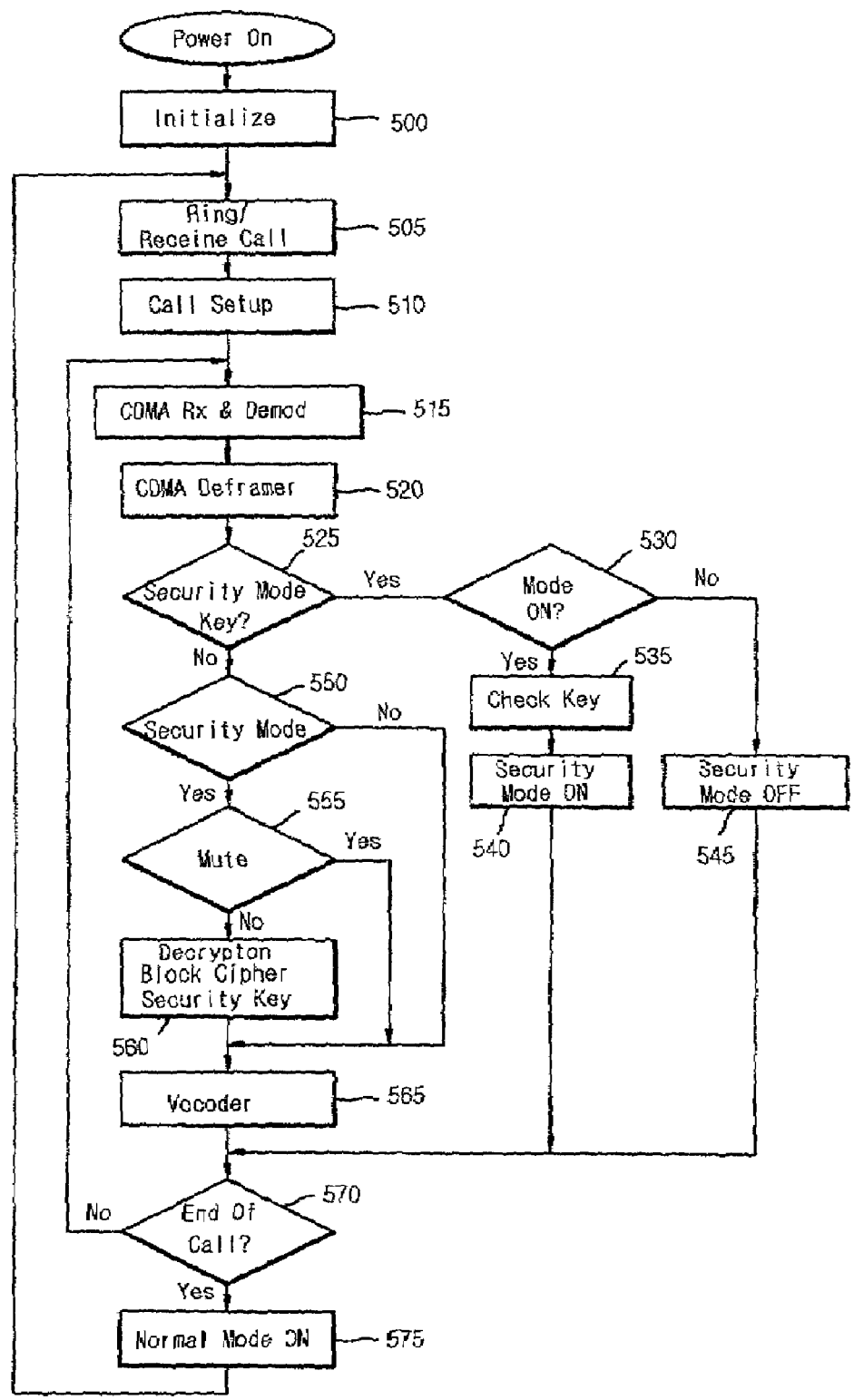
FIG. 5 is a flow diagram showing reception/decryption process according to a preferred embodiment of the present invention.

FIG. 5 shows the flow diagram of the reception/decryption process according to a preferred embodiment of the present invention, at the receiver corresponding to the transmitter in FIG. 4. Referring FIG. 5, the reception/decryption process will be described in detail.

First, when the power of the receiver is ON, the initialized process in the receiver is performed (step 500). Consequently, when a ring and a call are received (step 505), the call is setup between the transmitter and the receiver (step 510). Then, the receiver receives a modulated signal from the base station and reproduces the CDMA frame from the signal (step 515). The CDMA deframer extracts an encrypted vocoder packet information bit from the reproduced CDMA frame (step 520). The decryptor determines if a security mode pattern is included in the encrypted vocoder packet information bit (step 525). If the security mode pattern indicates the Security_Mode ON (step 530), then the decryptor checks an index included in the information bit and determines a security key corresponding to the index among the multiple security keys in the receiver (step 535), and the security mode of the receiver is set to ON (step 540). In the step 530, if the security mode pattern in the information bit indicates the Security_Mode OFF, then the security mode of the receiver is set to OFF (step 545).

In the case that the security mode pattern is not included in the vocoder packet information bit in a step 525, if the security mode of the receiver is ON (step 550) and the encrypted vocoder packet information bit is not a mute (step 555), then the decryptor decrypts the encrypted vocoder packet information bit using a block cipher and the security key (step 560). Otherwise, the steps 555 and 560 are bypassed. Such decrypted or bypassed vocoder packet information bit is decoded by the vocoder (step 565).

If the call is maintained in a step 570, then the routine is returned to the step 515. If the call is completed in the step 570, then the security mode is set to a normal mode (step 575) and the routine is returned to the step 505.

Each function in relation to the decryption process of the invention may be also implemented by a software or a hardware such as ASIC (Application Specific Integrated Circuit).

As described above, the present invention performs the encryption process between the vocoder and CDMA framer in the reverse traffic channel through the block cipher and performs the decryption process between the vocoder and CDMA deframer in the forward traffic channel through the block cipher.

Accordingly, since the information bit is transmitted in an encrypted form except for the receiver and transmitter, it is impossible to decrypt the encrypted information bit as the original vocoder packet without exactly knowing the algorithm and the security key, even if the encoded information bit is detected by an advanced technique.

Further, the invention has the advantage that, without the modification of the conventional base station and the switching system according to IS-95 standard, it enables the CDMA system to communicate privately with no overhearing.

The invention also provides the simple and safe method for sharing the security key, to thereby allow the communication between the different user groups using the different security key. Thus, it is possible to build up the security network readily among the small user groups.

The present invention has been described in terms of preferred embodiments. However, it should be understood that the present invention is not limited in its application to the specific embodiments. Those skilled in the art will recognize that various modifications and variations may be made without departing from the spirit and scope of this invention, as defined in the following claims.

What is claimed is:

1. A terminal for CDMA mobile communication system of IS-95 standard having data protection function, comprising:

a vocoder encoding the input analog signal as an information bit having a predetermined size and generating a vocoder packet;

an encryptor encrypting the vocoder packet from said vocoder and generating the encrypted vocoder packet;

a vocoder framer adding a format bit/format bits indicating the vocoder rate and, as a result, generating the encrypted vocoder frame;

a CDMA framer adding a frame quality indicator and the encoder tail bits to the encrypted vocoder frame from said vocoder framer to configure as a CDMA frame;

a CDMA frame transmitter transmitting a CDMA frame which passes a convolutional encoder, interleaver, and modulator in sequence, to a base station through an assigned frequency band;

a CDMA frame receiver receiving a signal from the base station and reproducing the CDMA frame;

a CDMA deframer extracting the encrypted vocoder frame from the CDMA frame reproduced by said CDMA frame receiver;

a vocoder deframer deleting a format bit/format bits indicating the vocoder rate from the encrypted vocoder frame and, as a result, extracting the encrypted vocoder packet;

a decryptor decrypting the encrypted vocoder packet extracted by said vocoder deframer; and a vocoder decoding the decrypted vocoder packet from said decryptor as an analog signal.

2. The terminal for CDMA mobile communication system having data protection function according to claim 1, wherein said encryptor encrypts using a block cipher such as DES, 3DES or a stream cipher, and a secret key, said decryptor decrypts using said block cipher or said stream cipher and the secret key shared by the other terminal.

3. The terminal for CDMA mobile communication system having data protection function according to claim 1, wherein said encryptor performs or bypasses the encryption by a security mode that a user set to ON or OFF.

4. The terminal for CDMA mobile communication system having data protection function according to claim 3, wherein said encryptor generates a predetermined pattern corresponding to ON or OFF of the security mode and adds the generated pattern to the format bit/bits of the traffic channel, and transmits it to the other terminal, wherein said decryptor performs or bypasses the decryption by setting ON or OFF of said security mode by said received pattern.

5. The terminal for CDMA mobile communication system having data protection function according to claim 3, wherein said encryptor adds the encrypted secret key to the format bit/bits and the predetermined security mode pattern of the traffic channel when the security mode is set to ON, wherein said decryptor recovers the secret key included in the vocoder frame of the traffic channel, and decrypts the encrypted vocoder packet using said recovered secret key.

6. The terminal for CDMA mobile communication system having data protection function according to claim 1, wherein said encryptor encrypts all or a the of the vocoder packet, wherein said decryptor decrypts all or a the of the encrypted vocoder packet.

7. A method for encrypting and transmitting information bit in CDMA mobile communication system of IS-95 standard, comprising the steps of:

(a) encoding an input signal as an information bit having a predetermined size and generating a vocoder packet;

(b) encrypting said encoded vocoder packet;

(c) adding a format bit/format bits indicating the vocoder rate, resulting the encrypted vocoder frame, and then adding a frame quality indicator and the encoder tail bits to the encrypted vocoder frame and configuring it as a CDMA frame; and (d) transmitting the CDMA frame which passes a convolutional encoder, interleaver, and modulator in sequence, to a base station through an assigned frequency band.

8. A method for encrypting and transmitting information bit in CDMA mobile communication system according to claim 7, wherein said step (b) encrypts using a block cipher such as DES, 3DES or a system cipher, and a secret key.

9. A method for encrypting and transmitting information bit in CDMA mobile communication system according to claim 8, wherein said step (b) performs or bypasses the encryption by a security mode that a user set.

10. A method for encrypting and transmitting information bit in CDMA mobile communication system according to claim 9, wherein said step (b) generates a predetermined pattern corresponding to ON or OFF of the security mode and adds the pattern to the information bit of the traffic channel.

11. A method for encrypting and transmitting information bit in CDMA mobile communication system according to claim 10, wherein said step (b) adds said secret key to the information bit of the traffic channel when the security mode is set to ON.

12. The method for encrypting and transmitting information bit in CDMA mobile communication system according to claim 7, wherein said step (b) encrypts only a part of the vocoder packet.

13. A method for receiving and decrypting information bit encrypted by terminal for CDMA mobile communication system of IS-95 standard, comprising the steps of:

(a) receiving a signal from a base station, and reproducing it as a CDMA frame;

(b) extracting an encrypted vocoder frame from the reproduced CDMA frame;

(c) extracting the encrypted vocoder packet from the extracted vocoder frame;

(d) decrypted the encrypted vocoder packet; and (e) decoding the decrypted vocoder packet.

14. The method for receiving and decrypting information bit encrypted by terminal for CDMA mobile communication system according to claim 13, wherein said step (b) decrypts using a block cipher such as DES, 3DES or a system cipher, and a secret key.

15. The method for receiving and decrypting information bit encrypted by terminal for CDMA mobile communication system according to claim 14, wherein said step (d) set a security mode to ON or OFF according to the predetermined pattern included in the received information bit of the traffic channel, and determines according to the security mode whether the decryption process is to be performed or not.

16. The method for receiving and decrypting information bit encrypted by terminal for CDMA mobile communication system according to claim 15, wherein said secret key is that included in the information bits of the traffic channel received when the security mode is set to ON.

17. The method for receiving and decrypted information bit encrypted by terminal for CDMA mobile communication system according to claim 13, wherein said step (d) decrypts only a part of the encrypted information bit from the encrypted vocoded packet.

* * * * *